United States Patent [19]

Tsay

[11] Patent Number: 5,673,215

[45] Date of Patent: Sep. 30, 1997

[54] NON-RESTORING FIXED-POINT DIVIDER APPARATUS

[75] Inventor: Albert Suan-Wei Tsay, Austin, Tex.

[73] Assignee: International Business Machines Corporation, Armonk, N.Y.

[21] Appl. No.: 746,708

[22] Filed: Nov. 15, 1996

Related U.S. Application Data

[63] Continuation of Ser. No. 319,203, Oct. 5, 1994, abandoned.

[51] Int. Cl.[6] ............................................. G06F 7/52
[52] U.S. Cl. ............................................. 364/767
[58] Field of Search ................................. 364/761, 764, 364/766, 767, 736

[56] References Cited

U.S. PATENT DOCUMENTS

| | | | |
|---|---|---|---|
| 5,105,378 | 4/1992 | Mori | 364/761 |
| 5,339,267 | 8/1994 | Ito | 364/761 |
| 5,420,809 | 5/1995 | Read et al. | 364/715.01 |

Primary Examiner—Chuong D. Ngo
Attorney, Agent, or Firm—Brian F. Russell; Andrew J. Dillon

[57] ABSTRACT

A divider for use in a data processing system and method of operation is disclosed The divider apparatus includes three 67-bit adders, coupled in parallel with one another for performing add or subtract functions, each adder being precharged during a first clock phase and executing selected functions during a second clock phase, which both occur during a single clock cycle. The first adder is connected to a first and second multiplexor, for selecting respective first and second operands. A third multiplexor, coupled to the second adder, is used to select a first operand for the second adder. Fourth and fifth multiplexors, which are coupled to the third adder, are used to select a respective first and second operand for the third adder. An adder operand select logic is coupled to the adders and the multiplexors for selecting whether to perform the add or subtract functions and for selecting which operands the multiplexors are to feed to their respective adders. An operand selection circuit is further added, which is coupled to the multiplexors and the adder operand select logic. The divider apparatus further comprising a remain quotient determination circuit coupled to the adders, and used for determining when a divide operation has been completed, what the divide result is, and whether there is a remainder quotient.

13 Claims, 4 Drawing Sheets

Adder block for Divider.

Figure 1: Operands selection block for Divider.

Figure 2: Adder block for Divider.

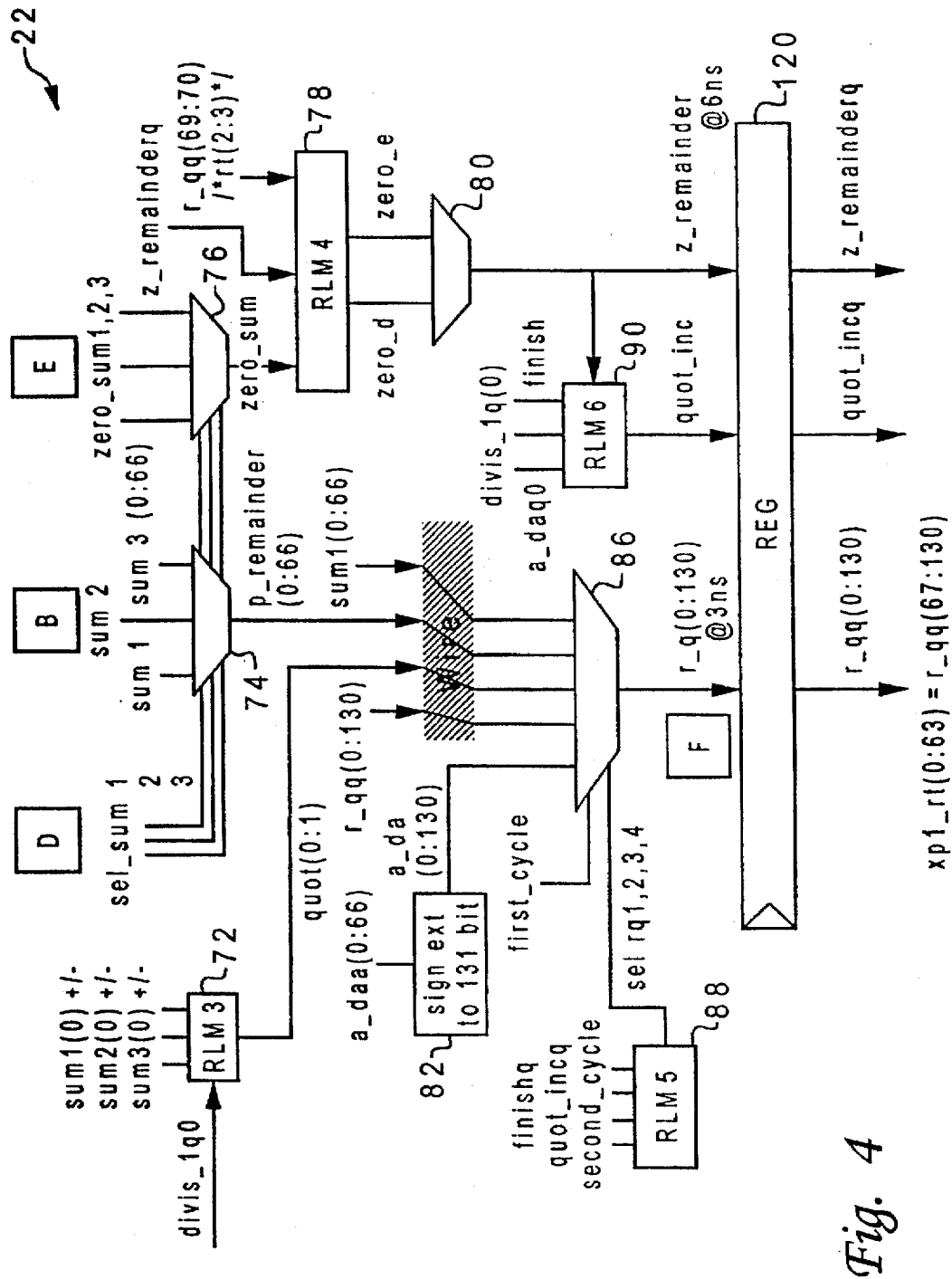
Fig. 4  Figure 3: Remain Quotient determination block for Divider.

NON-RESTORING FIXED-POINT DIVIDER APPARATUS

This is a continuation of application Ser. No. 08/319,203, filed Oct. 5, 1994, now abandoned.

BACKGROUND OF THE INVENTION

1. Technical Field

The present invention relates generally to data processing systems and more specifically to data processing systems providing fixed-point arithmetic operations. More specifically still, the present invention relates to a data processing system having a fixed-point divider that is non-restoring and that divides its cycle time half for the adder logic and the other half for the remaining logic.

2. Description of the Related Art

A conventional basic binary dividing apparatus generates a quotient bit by bit while the divisor is added to, or subtracted from a dividend, or a partial remainder repeatedly in accordance with the non-restoring algorithm. There is an improved apparatus which is capable of generating a plurality of quotient bits in one cycle. This apparatus is designed to shift a partial remainder, add or subtract a suitable multiple of a divisor to or from the shifted partial remainder, and, based on the resultant partial remainder, estimate a plurality of quotient bits while determining the shift length of the partial remainder in preparation for the subsequent operation. Unfortunately, this type of dividing apparatus bases its shift length upon the result of each addition or subtraction, which makes it difficult to reduce the cycle time.

Accordingly, what is needed is a fixed-point divider apparatus that is capable of generating multiple quotient bits in a single cycle while dividing the processing time equally between the adder portion and the remaining logic within the divider apparatus.

SUMMARY OF THE INVENTION

It is therefore one object of the present invention to provide a data processing system.

It is another object of the present invention to a provide data processing system providing fixed-point arithmetic operations.

It is yet another object of the present invention to provide a data processing system having a fixed-point divider that is non-restoring and that divides its cycle time half for the adder logic and the other half for the remaining logic.

According to the present invention, a fixed-point divider apparatus and method, based on a 64-bit non-restoring architecture, are disclosed. The divider apparatus includes three 67-bit adders, coupled in parallel with one another for performing add or subtract functions, each adder being precharged during a first clock phase and executing selected functions during a second clock phase, which both occur during a single clock cycle. The first adder is connected to a first and second multiplexor, for selecting respective first and second operands. A third multiplexor, coupled to the second adder, is used to select a first operand for the second adder. Fourth and fifth multiplexors, which are coupled to the third adder, are used to select a respective first and second operands for the third adder. An adder operand select logic is coupled to the adders and the multiplexors for selecting whether to perform the add or subtract functions and for selecting which operands the multiplexors are to feed to their respective adders. An operand selection circuit is further added, which is coupled to the multiplexors and the adder operand select logic, and is used to control the adder's operation during the second phase of a clock cycle. The divider apparatus further comprises a remain quotient determination circuit coupled to the adders, and used for determining when a divide operation has been completed, what the divide result is, and whether there is a remainder quotient increment.

The adders are selected such that the first adder generates an output remain plus or minus quotient 3x the divisor, the second adder generates an output remain quotient plus or minus twice the divisor, and the third adder generates an output remain quotient plus or minus the divisor. Each clock cycle operates at about 6 nanoseconds, thus meaning each clock phase is about 3 nanoseconds long.

The adders, being 67-bit adders, are capable of handling 64-bit and 32-bit operations.

The apparatus is designed so that two timing paths are formed, the first for determining a next divider operation and for generating a select signal for each multiplexor, which data path is performed within a half-clock cycle. The second data path is formed for sending signed bytes from the adders, for determining which results from the adders is the correct result, for generating a quotient bit, and a next set of operands for the next divider operation. Like the first data path, the second data path results are generated within a half-clock cycle.

The method is designed to operate on a divider apparatus substantially similar to that previously described. The first step, occurring during a first phase of a clock cycle, delivers first and second operands to the operand selection circuit. This allows the adders to be precharged with these operands. During the second phase of the clock cycle, the adders perform their evaluation operation and the results are examined to determine the next adder operation to be performed. Significantly, the logic functions of determining the adder results, selecting a proper adder result, checking the signage, selecting an appropriate adder for the next adder operation, generating a 2-bit quotient, are all intended to be performed during a first phase of the designated clock cycle. The actual evaluation of the operands during the adder operation is always performed during the second phase of a clock cycle. This results in a more efficient divider apparatus design than would otherwise be possible if the adder evaluation occurred at any time during the first or second phases of the particular clock cycle.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram of the remain quotient determination block circuit shown in FIG. 1.

DETAILED DESCRIPTION OF THE PREFERRED EMBODIMENT

Figure 1:
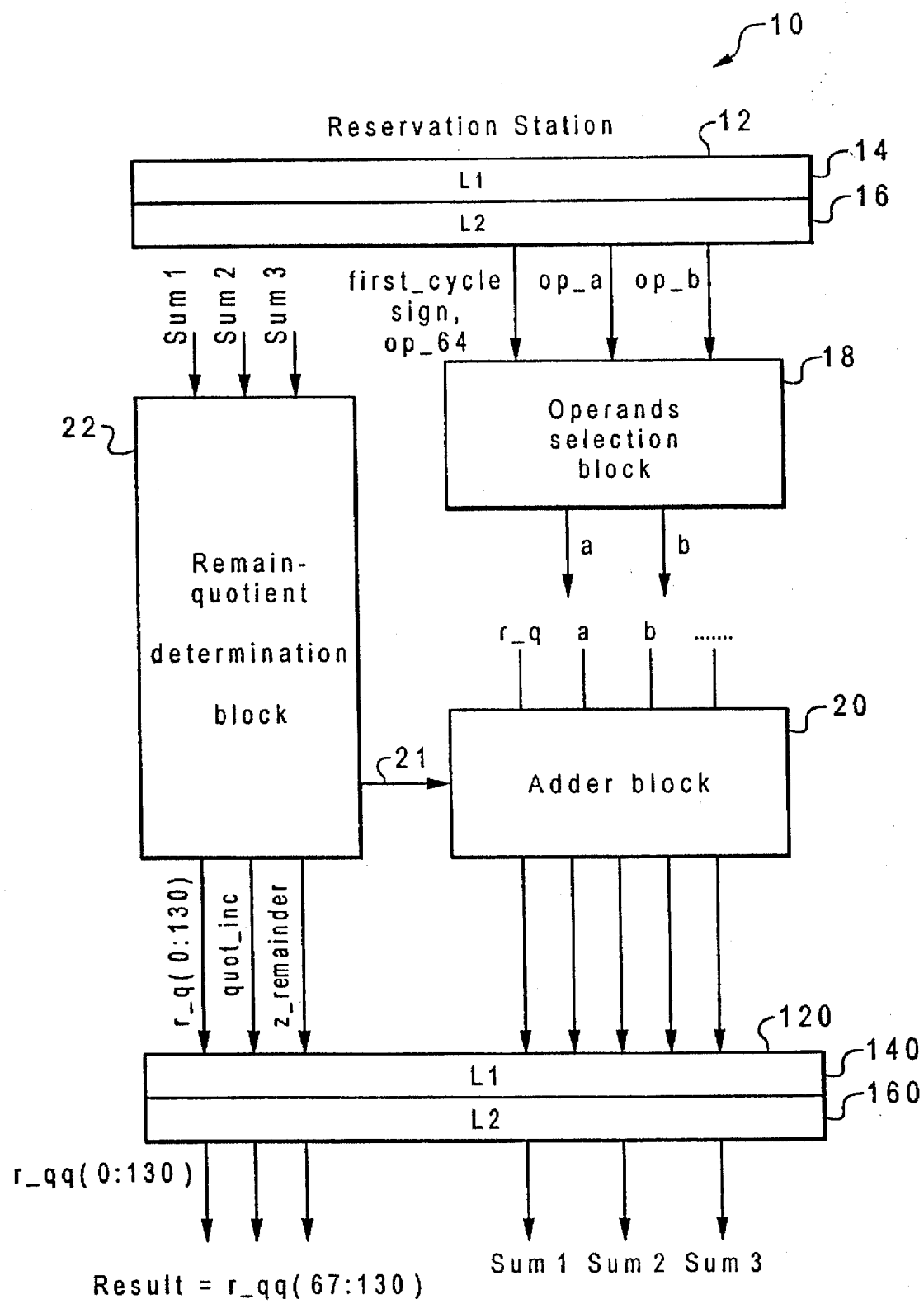
FIG. 1 is a block diagram of a fixed-point divider unit.

With reference now to the figures and in particular with reference to FIG. 1, a block diagram of a fixed-point divider processor 10 is illustrated. A register 12 is provided and is connected to a Reservation Station, which issues instructions from a buffer to register 12, which then sends the instructions to the various blocks within fixed-point divider 10. Register 12 further comprises a first latch 14 and a second latch 16 (L1 and L2, respectively). Register 12 operates in two phases; latch 14 is controlled by a clock C1, which establishes the second phase, and latch 16 is controlled by a clock C2, which establishes the first phase or phase 1.

Register 12 feeds a first operand op-a and second operand op-b to an operands selection block 18, which is more fully depicted in FIG. 2 and more fully described below. A first cycle, sign, and op_64 inputs are also sent from register 12 to operands selection block 18. Operands selection block 18 determines whether the divide operation is either signed or unsigned, or has 64 bits or 32 bits, and whether there is a divide overflow because of the denominator being zero.

Once the first and second operands have been processed, they are sent to adder block 20, along with a remain quotient signal from a separate clock cycle. Adder block 20 performs the arithmetic functions of divide and is more fully illustrated in FIG. 3, and more fully described below. The results from adder block 20 are fed to register 120 where the results are fed to remain quotient determination block 22 via lines sum1, sum2, and sum3. Remain quotient determination block 22 is used to determine any remainder quotients based on any of the three sum results from lines sum1, sum2, and sum3. A select signal line 21 is further connected to adder block 20 for selecting various multiplexors and adder functions within adder block 20. Remain quotient determination block 22 further includes a remain quotient r_q line. A quotient increment quot_inc line and a (z_remainder) line connect to register 120 for providing additional information with respect to any remainder quotient, quotient incrementation, and zero_remainder or completion signal.

Figure 2:
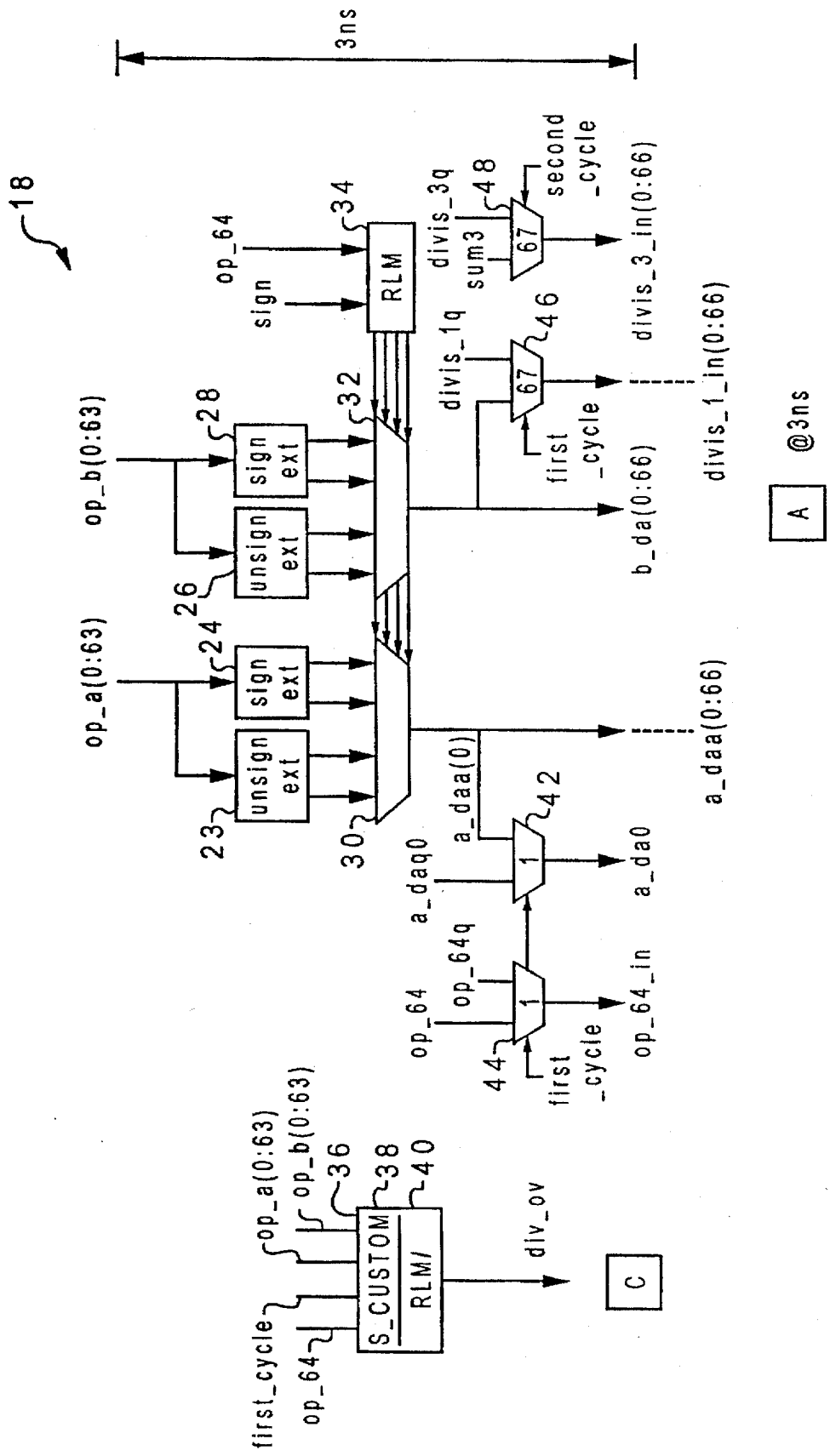
FIG. 2 is a block diagram of the operands selection block circuit shown in FIG. 1.

In FIG. 2, a block diagram of the operand selection block 18 is illustrated for fixed-point divider 10. Operand A (op_A) and operand B (op_B) feed to unsigned extension blocks 23 and 26, respectively, and to signed extension blocks 24 and 28, respectively. The pair of extension blocks 23 and 24 feed to a first four-to-one multiplexor while the extension blocks 26 and 28 feed to a second four-to-one multiplexor 32. The MUX selects for both multiplexor 30 and 32 are controlled by and/or logic 34, which determines the signal to be multiplexed based upon the inputs of the signed line and the operand 64 (op_64) assertion signal. Since the divider can handle either 64-bit or 32-bit operations, the operand 64 line determines whether a 64-bit or a 32-bit operation is to be performed. The signed line determines whether an unsigned or a signed operation is to be performed. The output from multiplexor 30 feeds directly to adder block 20 of FIG. 3 and also to a 1-bit multiplexor 42, which has an additional input from the a_daq0 line, which keeps track of the sign bit of op_a (divident) during the entire divide operation.

Figure 3:
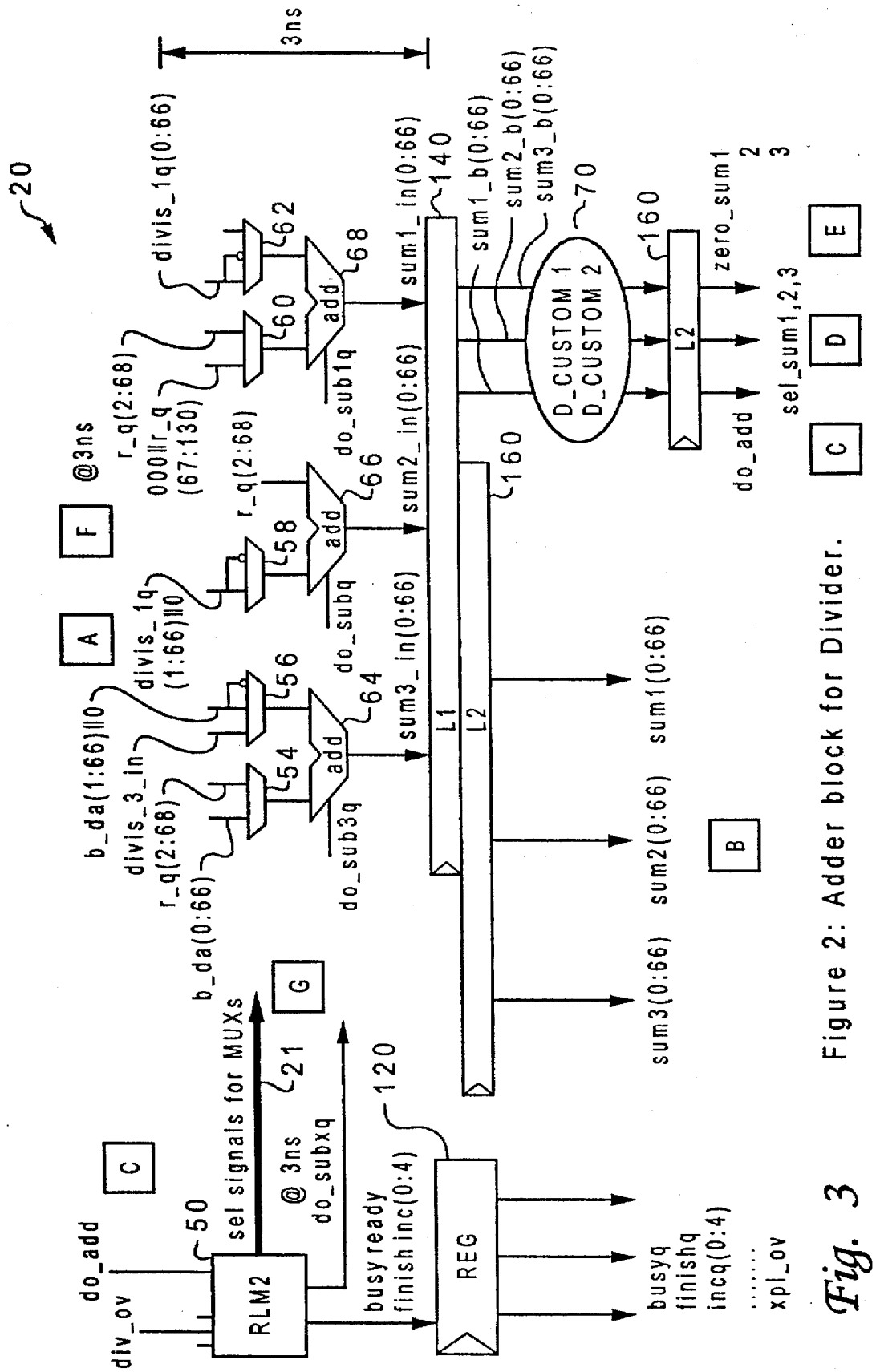
FIG. 3 is a block diagram of the adder block circuit shown in FIG. 1.

Multiplexor 42 is controlled by a first cycle line (first_cycle), which also controls single bit-multiplexor 44. Multiplexor 44 receives the op_64 signal and the op_64q (a latched op_64 signal), which is active upon subsequent cycles after the first load operation. Operand B feeds directly to adder block 20, which is shown in FIG. 3, and to a 67-bit multiplexor 46, which also receives a 1x divisor (divis_1q) signal, which keeps track of the 1x divisor during the entire divide operation. Multiplexor 46 is further controlled by first cycle signal. An additional 67-bit multiplexor 48 is used to select between a sum3 line and a 3x divisor (divis_3q) signal, which keep track of 3x divisor during the entire divide operation. Multiplexor 48 is controlled by the second clock cycle or second_cycle line. Multiplexor 44 then feeds to the op_64_in line which feeds back to a register that feeds to op_64_q. Multiplexor 42 has an output signal A_da0, which feeds to a register to store the sign of a_daa (a_daq0). Multiplexor 46 has an output signal divis_1_in, which feeds to register 120 to store the 1x divisor (divis_1q). Multiplexor 48 has an output signal divis_3_in, which feed to register to store the 3x divisor (divis_3q). Operands selection block 18 further includes a divide/zero detect logic 36. Divide overflow logic 36 receives operands A and B and determines whether the divide operation would be impossible with the denominator being zero. Additional input signals include op_64 and first_cycle, which are needed to determine 64-bit/32-bit overflow occur at the first cycle. The output from block 36 feeds to adder block 20.

Adder block 20 is more fully depicted in the block diagram of FIG. 3. Adder block 20 has an adder operands select logic 50, which receives the div_ov and the do_add signal, for determining the next addition or subtraction operation to be performed at the next cycle and for determining the operands to feed into the adders. From the adder operands select logic 50, a select signal for a multiplexor line 21 feeds to three adders in adder block 20. Two additional output signals include do_subxq, which determines whether addition or subtraction should be performed by the adders, and a busy, ready, finish, and increment line, for indicating when the divider is busy, ready, or finished. The busy, read, finish, increment line feeds to register 120, which is then further fed to the Reservation Station. Adder block 20 receives many input signals from operand selection block 18 through an assorted number of multiplexors 54, 56, 58, 60, and 62. Multiplexor 54 determines the first operand of adder 64. Multiplexor 56 determines the second operand of adder 64. Multiplexor 58 determines the first operand of adder 66. Multiplexor 60 determines the first operand of adder 68, and multiplexor 62 determines the second operand of adder 68.

Multiplexors 54 and 56 connect to adder 64. Multiplexor 58 is connected to adder 66, which also receives an input signal from r_q line. Multiplexors 60 and 62 are further connected to adder 68. Adders 64, 66, and 68 are 67-bit adders that work in parallel during the divide operation. Each adder 64, 66, and 68 is controlled by a signal from the adder operands select logic 50. The outputs from adders 64, 66, and 68 are then fed to register 120 through latch 140. Adder 64 generates an output remain_quotient plus or minus 3 times the divisor. Adder 66 generates a remain_quotient plus or minus 2 times the divisor. Adder 68 outputs a remain_quotient plus or minus the divisor. These three outputs are further sent to zero detect and sum selector circuit logic 70, which also looks at the sign bit of either sum1, sum2 or sum3. Zero detect and sum selector circuit 70 further selects whether to do an add function or a subtraction function for the next operation and whether that function should involve sum1, sum2, or sum3. These signals are outputted through second latch 160. The adder outputs sum3, sum2 and sum1 are further connected to remain quotient determination block 22 illustrated in FIG. 4.

FIG. 4 more fully depicts a block diagram of the remain quotient determination block 22. Block 22 includes a quotient generator 72 that looks at the sign bit of either sum1, sum2, or sum3 as well as the divis_1q0 input from operand selection block 18. Two three-by-one multiplexors 74 and 76 are also provided. Multiplexor 74 selects from either sum1, sum2, or sum3 based on the select_sum1, sum2 or sum3 from selector block 70. Multiplexor 76 selects from lines zero sum1, 2, or 3 based upon the select line of select_sum1, 2 or 3. The output signal of MUX 76 is connected to a zero remainder calculation circuit 78, which looks at the zero sum block 18 determines whether the operands are signed or unsigned, or 64-bit or 32-bit operations. This operation is completed within 3 nanoseconds, before the rising edge of clock C1. This information represented by the block A in FIG. 2. The operand selection block 18 uses a static zero and −1 detector so that it need not be triggered by the clock C1, thus saving a half-cycle of time, from precharging. An example of a typical divide operation is shown in Table 1.

| CYCLE | PHASE 1 | PHASE 2 |
|---|---|---|
| 1 | Sign Extension. | Calculate 3 × divisor. |
| 2 |  | r_q+/−1D;r_q+/−2D;r_q+/−3D; |
| 3 | 2 bit quotient (first 2 bits). Do_add or subtract for next cycle. | r_q+/−1D;r_q+/−2D;r_q+/−3D; |
| 4 | 2 bit quotient. Do-add or subtract for next cycle. | r_q+/−1D;r_q+/−2D;r_q+/−3D; |
| . | . | . |
| . | . | . |
| . | . | . |
| 34 | 2 bit quotient (32nd 2 bits) quotient need increment or not. |  |
| 35 | Generate mux_sel for quotient increment | r_q=r_q+1 (If quotient need increment) |
| 36 | Result |  | signal, the zero remainder (z_remainderq), and the remainder quotient (r_q). The outputs from circuit 78, zero_d and zero_e are then fed to multiplexor 80, which selects either signal for feedback as either z_remainder signal to circuit 78 through register 120 or to quotient correction circuit 90.

A sign extension circuit 82, which sign extends a_daa from 67 bit to 131 bit, inputs line signal A_daa and outputs A_da to multiplexor 86. Various other signals such as r_qq, quot, p_remainder, and sum1, connect to multiplexor 86, which has an output further connected to register 120. This output is the remainder quotient or r_q. The control of multiplexor 86 is performed by remainder quotient selector logic 88, which bases its select remainder quotient 1, 2, 3, or 4 (sel_rq1 ,2,3,4) based upon the inputs of finishq, quot_incq, and second_cycle. Quot_incq is the product of quotient correction circuit 90, which used inputs a_daq0, divis_1q, and finish to determine whether to increment the quotient by 1 at the last cycle.

The fixed-point divider circuit 10 is able to generate two (2) quotient bits in a cycle with the adders in the divider only taking a half-cycle. In the preferred embodiment, a cycle time is six (6) nanoseconds (ns), which means there is three (3) nanoseconds dedicated to the adder phase and three nanoseconds dedicated to the remaining logic steps necessary in performing the fixed-point divide operation. The 6 nanosecond cycle time for the 2-bit per cycle divider is accomplished by using three 67-bit adders working in parallel. These adders are precharged during the first phase of the clock cycle, and evaluate during the second phase of the cycle. For optimal operation, the adders operate during the second phase of the cycle so as to reduce the number of potentially necessary registers from six down to three 67-bit registers. The adders precharge during the first phase, which allows the remaining logic in divider circuit 10 to be performed.

Referring back to FIG. 1, during a sample operation, data from the Reservation Station (operands A and B) are delivered to operand selection block 18 at the beginning of the first cycle. During this first cycle, the operand selection The most critical timing path during an operation require that the data must arrive at the MUXs connected to adders 64, 66, and 68 of adder block 20 before the rising edge of clock C1. The data arrives at points A, F, and G before 3 nanoseconds. One of the critical paths is that by which the results from the three adders follows which includes determining the next operation (addition or subtraction), then generating the select signals for the multiplexors in front of adders 64, 66, and 68. The next most critical path is when the signed bits are taken from the results of the three adders, then determining which results from adders 64, 66 and 68 should be the correct results, then generating a 2-bit quotient, and then finally generating the operands for the next addition operations. Each path must be finished within a half-cycle or three nanoseconds.

Referring back to FIG. 2, the most critical part of both of the critical paths is implemented by dynamic circuits where select_sum1 (2,3) is a one-stage domino circuit and the do_add circuit is a two-stage domino circuit. These dynamic circuits are precharged while the adders are in the evaluation phase and then these circuits are evaluated when the adders are precharged. The results from adders 64, 66, and 68 are then fed to second latch 160 which is transparent so as not to violate the rules under the level sensitive scan design (LSSD) format. The operation for performing the select_sum1, 2, 3 requires about 0.4–0.5 nanoseconds and the do_add operation takes approximately 0.8–0.9 nanoseconds. Thus, the first critical path then becomes 0.9 nanoseconds for do_add in the adder block 20 and latch 16 transparent latch, and an RLM (three levels of gates at worst, i.e., inv., nand, and inv) in three nanoseconds. The second critical path then, is the 0.4 nanosecond for the select sum1 in the adder block plus a 3-to-1 multiplexor 74 followed by a 5-to-1 multiplexor 86 in the remain quotient determination block 22 of FIG. 4, and the generate remain quotient for the operands for the next addition or subtraction. Both critical paths are both well below the three nanosecond restriction for optimal operation time.

The divider is designed for high performance fast clock central processing units, such as, for example, the PowerPC family of high performance microprocessing units. This circuit makes use of three custom-designed blocks. The first custom block is the static zero detector in the data path used in the operand selection block 18. The second block is a dynamic zero detector for determining the adders results in adder block 20. The third custom block is a second dynamic block connected to the first dynamic block for generating the do_add, sel_sum1, sel_sum2, sel_sum3 operations in the adder block 20. Since only the three custom blocks are used, the remaining functions are readily available from off-the-shelf type designs.

The most distinguished advantage of this architecture is that it partitions the operations needed for the divide function into different function blocks and different phases so that the most critical path is greatly simplified and its delay minimized. Significantly, the most critical path is a dynamic block (do_add)+transparent latch+inv+nand+inv in one-half cycle, which is a simple and efficient solution to meeting the timing requirements. Thus this architecture is suitable for fast clock rates.

While the invention has been particularly shown and described with reference to a preferred embodiment, it will be understood by those skilled in the that various changes in form and detail may be made therein without departing from the spirit and scope of the invention.

I claim:

1. A fixed-point divider apparatus having a divider-input providing first, second, third, fourth, and fifth groups of input signals, said groups of input signals including a partial remainder and a divisor, wherein said fixed-point divider produces quotient bits as an output, said divider apparatus comprising:

first, second, and third adders, coupled in parallel one with another, for performing add or subtract functions, each adder being precharged during a first clock phase and executing one of said functions during a second clock phase, said first and second clock phases occurring during a single clock cycle;

first and second multiplexors, coupled to said divider-input and to said first adder, for selecting a respective first operand and a second operand for said first adder, which said first and second operands are selected from said first and second group of input signals, respectively;

a third multiplexor, coupled to said divider-input and to said second adder, for selecting a first operand for said second adder, which first operand for said second adder is selected from said third group of input signals;

fourth and fifth multiplexors, coupled to said divider-input and to said third adder, for selecting a respective first operand and a second operand for said third adder, which first and second third adder operands are selected from said fourth and fifth group of input signals, respectively;

an adder operand select logic circuit, coupled to said first, second, and third adders and said multiplexors, for selecting whether to perform the add or subtract function and for selecting which operands said first second third, fourth, and fifth multiplexors feed to said first, second, and third adders; and a remain quotient determination circuit, coupled to said first second, and third adders, for determining when a divide operation has been completed, what the divide result is in the form of said quotient bits, and whether there is a remainder quotient increment.

2. The apparatus according to claim 1, wherein said first adder generates an output remain quotient plus or minus three times the divisor, said second adder generates an output remain quotient plus or minus two times the divisor, and said third adder generates an output remain quotient plus or minus the divisor.

3. The apparatus according to claim 1, wherein said clock cycle is about 6 nanoseconds and each said first and second clock phases are about 3 nanoseconds.

4. The apparatus according to claim 1, wherein said first, second and third adders are 67-bit adders capable of handling 64-bit and 32-bit operations.

5. The apparatus according to claim 1, wherein said adder operand select logic circuit determines whether said operands are signed or unsigned.

6. The apparatus according to claim 1, wherein said operand selection circuit determines whether said function is a divide by zero operation.

7. The apparatus according to claim 1, wherein said operand selection circuit and said remain quotient determination circuit operate during said first clock phase.

8. The apparatus according to claim 1, wherein said remain quotient determination circuit generates a next divider operation signal and a select signal for each of said first, second, third, fourth, and fifth multiplexors, which said next divider operation is performed within a half-clock cycle.

9. The apparatus according to claim 1, wherein said remain quotient determination circuit receives signed bits from said first, second, and third adders, determines which of said signed bits constitutes a correct result, and generates a quotient bit and a next set of operands for the next divider operation, all within a half-clock cycle.

10. In a fixed-point divider apparatus having a plurality of adders including first, second, and third adders coupled in parallel, a plurality of multiplexors coupled to said plurality of adders, including first, second, third, fourth, and fifth multiplexors, an adder operand select logic coupled to said plurality of adders and to said plurality of multiplexors, an operand selection circuit coupled to said adder operand select logic and said plurality of multiplexors, and a remain quotient determination circuit coupled to said plurality of adders, a method of performing a fixed-point divide operation, comprising the following steps:

during a first phase of a clock cycle having a first and second phase, delivering first and second operands, selected from groups of input signals by said plurality of multiplexors, to said operand selection circuit for said plurality of adders;

during said first phase, precharging said plurality of adders and selecting respective first and second operands for each of said first, second, and third adders;

during said second phase, performing an adder operation on said selected first and second operands in said plurality of adders, wherein said adder operation yields first, second, and third adder results;

during a subsequent first phase, determining a next adder operation on at least one of said first, second, and third adder results;

during said subsequent first phase, generating adder results select signals for at least one of said plurality of multiplexors to select a desired one of said plurality of adders for performing said next adder operation;

during said subsequent first phase, selecting a correct result from said first, second, and third adder results;

generating a multi-bit quotient;

generating a next set of operands based on said selected correct result for said next adder operation; and during a subsequent second phase of a clock cycle, performing said next adder operation yielding another set of first, second, and third adder results.

11. The method according to claim 10, further comprising the step of during said first phase, determining the sign of said first and second operands and a length of said first and second operands.

12. The method according to claim 10, further comprising the step of during said first clock phase, determining whether said operation is a divide by zero operation.

13. A fixed-point divider for determining a quotient in response to receipt of a dividend and a divisor, said fixed-point divider comprising:

an adder circuit formed from dynamic logic, said adder circuit being precharged during a first phase of a clock cycle including first and second phases, wherein during said second phase, said adder circuit individually combines a partial remainder with each of a plurality of different multiples of said divisor to form a corresponding plurality of intermediate sums, said dividend forming said partial remainder for an initial clock cycle; and a remain-quotient circuit formed from dynamic logic, said remain-quotient circuit receiving said intermediate sums as inputs, wherein during said first phase, said remain-quotient circuit produces multiple bits of said quotient and an indication of one of said plurality of intermediate sums that is to be utilized as said partial remainder during said second phase of said clock cycle.

* * * * *